Sept. 16, 1952 J. HELLER 2,610,826
WHEEL HUB CABLE POWER UNIT COMBINATION WINCH AND HOIST
Filed March 26, 1948 3 Sheets-Sheet 1

INVENTOR
Julius Heller,
BY Geo B Rawlings
ATTORNEY

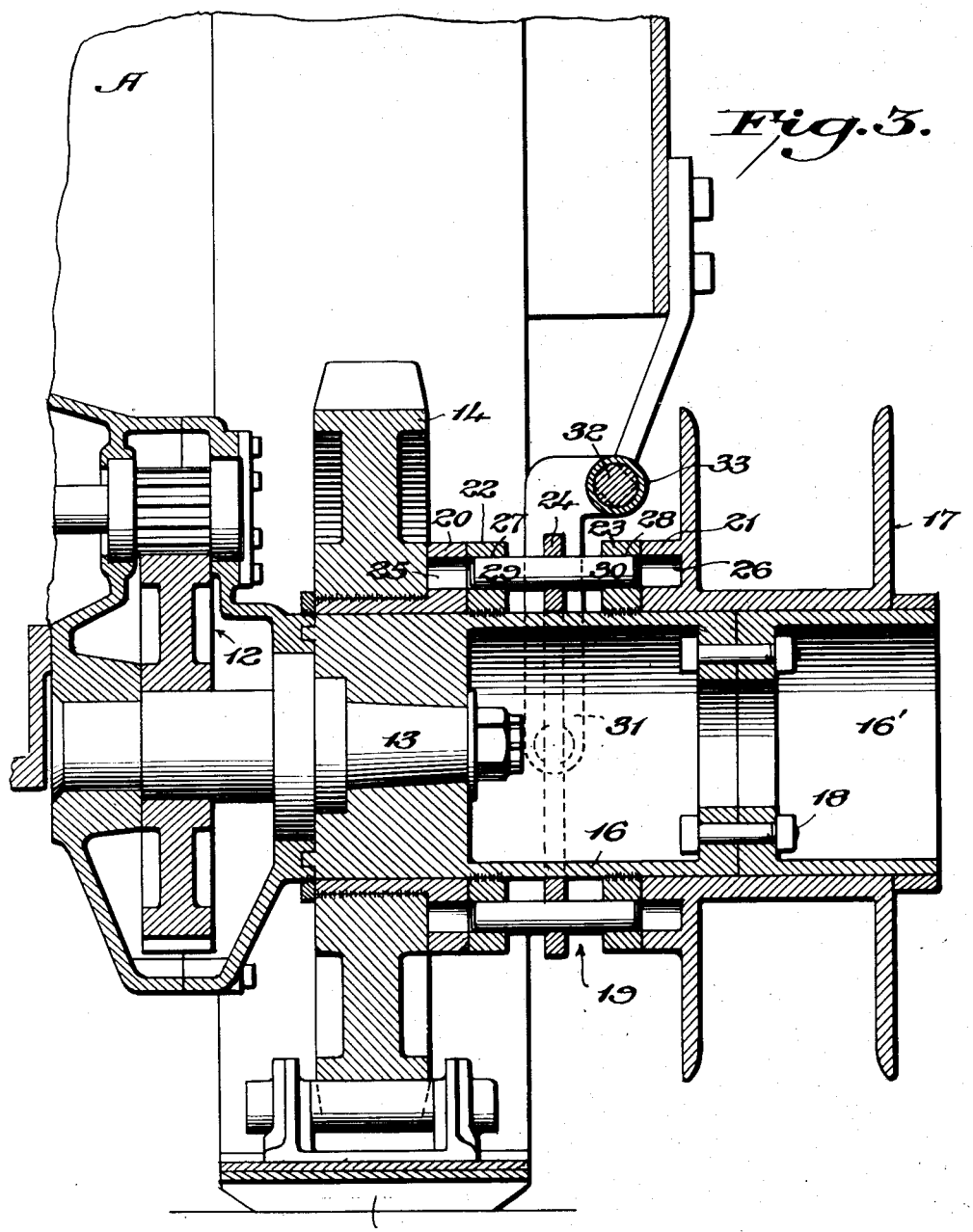

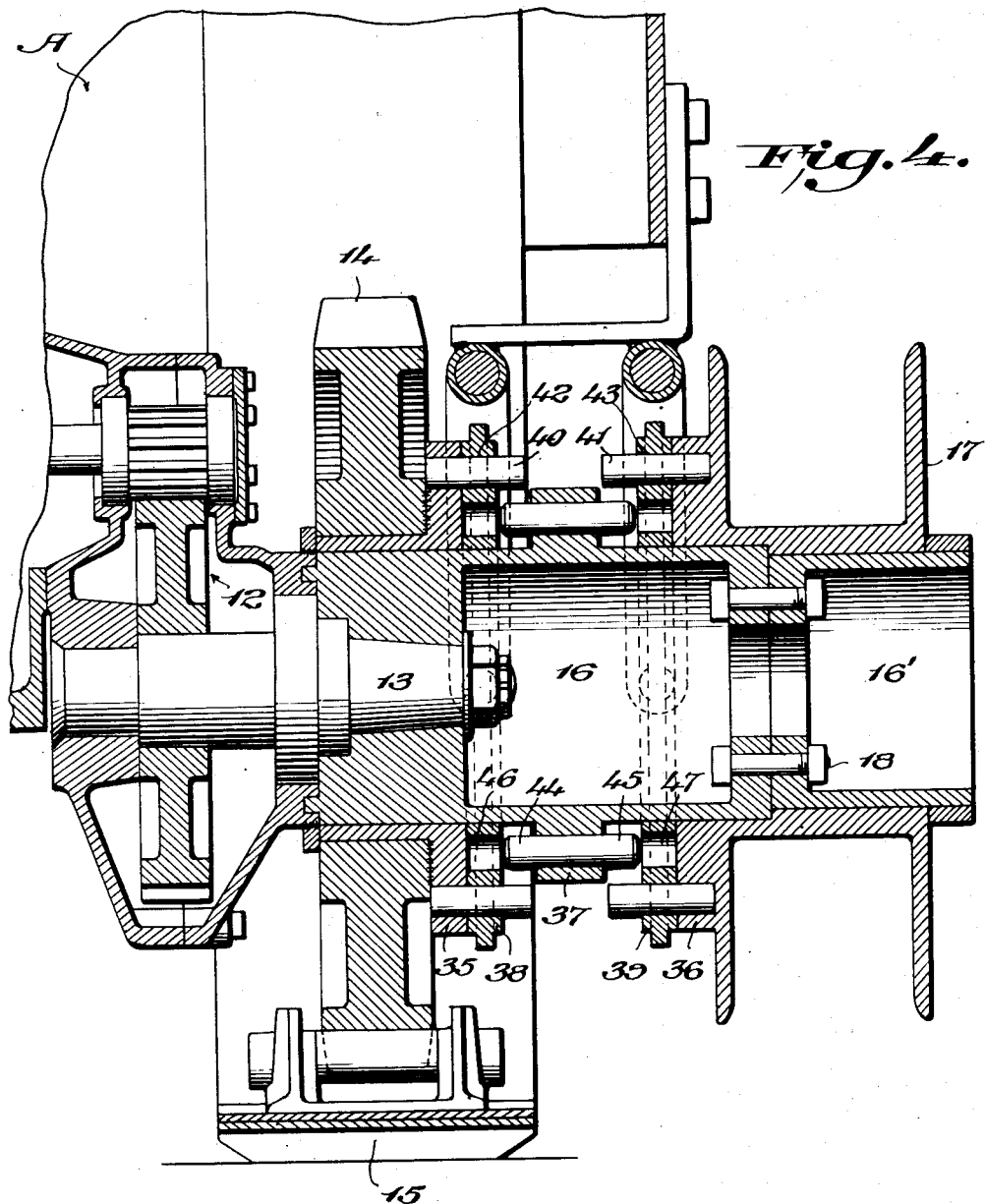

Patented Sept. 16, 1952

2,610,826

UNITED STATES PATENT OFFICE 2,610,826

WHEEL HUB CABLE POWER UNIT COMBINATION WINCH AND HOIST

Julius Heller, Portsmouth, Va.

Application March 26, 1948, Serial No. 17,184

5 Claims. (Cl. 254—166)

This invention relates to a power unit, such as a winch or the like, to be mounted upon and to be powered by a self-propelled vehicle, such as a tractor, truck or the like.

Heretofore, when equipping a vehicle such as a tractor, truck or the like, with a power unit such as a winch or the like, the usual practice has been to provide a power transmission and control mechanism for the power unit separate and distinct from the power transmission and control mechanism of the vehicle. Thus, in many instances, the power transmission and control mechanism of the power unit has included parts, such as a clutch, brake, speed reduction gear, variable speed transmission gear and the like, which are included in the conventional power transmission and control mechanism of the vehicle. As a consequence, there has been expensive duplication of parts, undesirable weighting and unbalancing of vehicles in many instances by the weight of power units applied thereto, and many other disadvantages in connection with said usual prior practice.

Accordingly, the general object of the present invention is to so construct a power unit such as mentioned, and to so mount the same upon a tractor, truck or the like, as to utilize in a large measure the conventional power transmission and control mechanism of the vehicle for the operation and control of said unit, thus greatly to simplify the construction of such units, greatly to reduce their weight and expense and to secure all of the many other advantages inherent to the use of the conventional power transmission and control mechanism of a vehicle for the operation and control of a power unit.

With the foregoing and other objects in view, which will become more fully apparent as the invention is better understood, the same consists in a power unit for self-propelled vehicles embodying the novel features of construction, combination and arrangement of parts, as are illustrated by way of example in the accompanying drawings and as will be hereinafter more fully described and claimed.

In the accompanying drawings:

Fig. 3 is a section on an enlarged scale on the line 3—3 of Fig. 1; and

Fig. 4 is a view similar to Fig. 3 illustrating an alternative embodiment of the invention.

Figure 1:
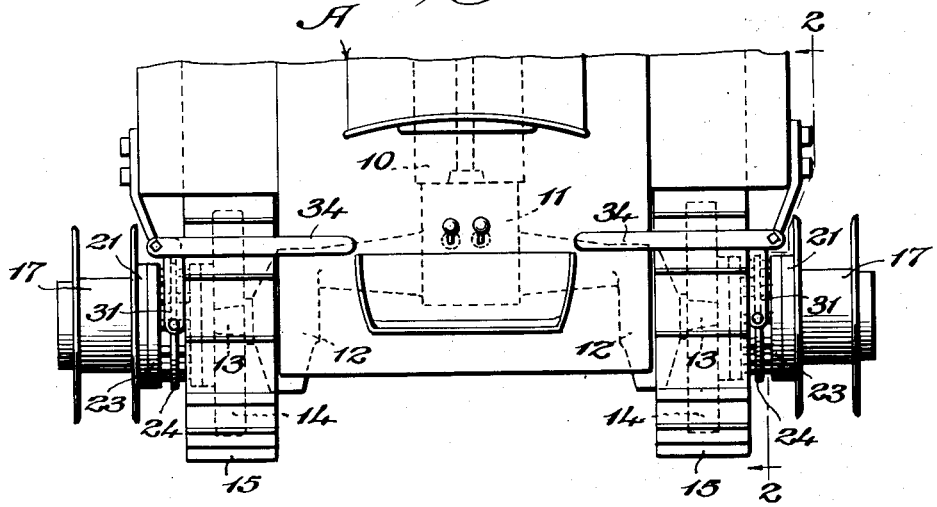
Fig. 1 is a top plan view of the rear portion of a tractor of the crawler type equipped with a pair of power units in accordance with the invention.

Referring to the drawings in detail, A designates, generally, a portion of a tractor which is understood to include an engine and a clutch (not shown) and which further includes, as usual, a variable speed transmission gear 10, a differential gear 11 and speed reduction gears 12 constituting a power transmission and control mechanism for so-called final drive shafts 13, 13 upon which are mounted sprocket wheels 14, 14 for driving the tracks designated as 15, 15. Since the two power units shown are right and left hand duplicates of each other, a description of one will suffice for both.

In accordance with the invention, a sleeve 16 is suitably fastened rigidly to the final drive shaft 13 and constitutes an outwardly extending, axial prolongation of said shaft. Upon the inner end portion of this sleeve the sprocket wheel 14 is suitably mounted so that it is held against axial or endwise movement and so that it and said sleeve are rotatable relative to each other.

A cable drum 17 also is suitably mounted on the sleeve 16, adjacent to the outer end thereof so that it is held against axial or endwise movement and so that it and said sleeve are rotatable relative to each other.

Preferably the outer end portion 16' of said sleeve upon which the drum 17 is mounted, is separate from the inner end portion of said sleeve and is bolted or otherwise suitably detachably connected to the said inner end portion of said sleeve, as indicated at 18, so that when not in use said sleeve outer end portion and the drum 17 may be removed from the inner end portion of said sleeve to avoid any appreciable projection of any part of the power unit beyond the side of the tractor.

For drivingly connecting and disconnecting either the sprocket wheel 14 or the drum 17 with and from the sleeve 16, I provide a suitable clutch mechanism designated generally as 19, which is operable by the driver of the vehicle. Such clutch mechanism preferably is mounted on the sleeve 16 between the drum 17 and the sprocket wheel 14 and may be of any suitable type. As illustrated in the drawings, however, it comprises an annular flange 20 welded or otherwise suitably fixed to the outer side of the sprocket wheel 14; an annular flange 21 welded or otherwise fixed to the inner side of the drum 17; a pair of annular flanges 22 and 23 welded or otherwise suitably fixed to the sleeve 16 adjacent to the flanges 20 and 21, respectively; and a ring 24 mounted loosely on said sleeve, between the flanges 22 and 23, for rotation and longitudinal movement relative to said sleeve. In the flanges 20, 21, 22 and 23 are annular series of equally spaced apart holes 25, 26, 27 and 28, respectively, while projecting from opposite sides of the flange 24 are annular series of pins 29 and 30, respectively, which have the same spaced apart relationship relative to each other as the holes 25, 26, 27 and 28.

The spaced apart relationship of the flanges 22 and 23 is such, in relation to the lengths of the pins 29 and 30, that when the ring 24 is in a position midway between said flanges 22 and 23, the pins 29 and 30 are disposed in the holes 27 and 28 of said flanges 22 and 23, but are not disposed in the holes 25 or 26 of the flanges 20 and 21. Moreover, the spaced apart relationship of the flanges 22 and 23 is such that the ring 24 may be shifted inwardly along the sleeve 16 an amount to engage the pins 29 in the holes 25 of the flange 20, or outwardly along said sleeve an amount to engage the pins 30 in the holes 26 of the flange 21. In this connection the spacing of the flanges 22 and 23 may be such that the pins 29 and 30 are at all times engaged in the holes 27 and 28 of said flanges. In any event, in any position of the ring 24, either the pins 29 are engaged in the holes 27 of the flange 22 or the pins 30 are engaged in the holes 28 of the flange 23. Consequently, since the flanges 22 and 23 are fixed to the sleeve 16, the pins 29 and 30 always are rotatable with said sleeve. It follows, therefore, that when the ring 24 is shifted inwardly along the sleeve 16 to engage the pins 29 in the holes 25 of the flange 20, the sleeve 16 is drivingly coupled to the sprocket wheel 14. It likewise follows that when the ring 24 is shifted outwardly along the sleeve 16 to engage the pins 30 in the holes 26 of the flange 21, the sleeve 16 is drivingly coupled to the drum 17. It further follows that when the ring 14 is in a position midway between the flanges 22 and 23 with the pins 29 disengaged from the holes 25 in the flange 20 and the pins 30 disengaged from the holes 26 in the flange 21, the sleeve 16 is drivingly disconnected from both the sprocket wheel 14 and the drum 17. Manifestly, therefore, the mechanism just described affords a means whereby the sleeve 16 may rotate without driving either the tractor or the drum 17, and whereby either the tractor to the exclusion of said drum, or said drum to the exclusion of the tractor, may be driven by said sleeve 16. Moreover, since the sleeve 16 is driven by the conventional power transmission and control mechanism of the tractor, it is apparent that whenever the sleeve 16 is coupled to the sprocket wheel 14 or to the drum 17, the tractor or said drum, as the case may be, is driven by and is under the control of the conventional power transmission and control mechanism of the tractor with all inherent advantages as distinguished from the prior disadvantageous practice of providing a power transmission and control mechanism separate from the conventional power transmission and control mechanism of a tractor, truck or the like for the control of a cable drum or the like.

While any suitable means may be provided for shifting the ring 24, a suitable means for this purpose may comprise fork arms 31 suitably engaged at their free ends with said ring and connected at their other ends to a shaft 32 which may be journaled for rotation in a suitable bracket or support 33 suitably mounted on the tractor. From the shaft 32 a suitable handle 34 may extend to a point where it is in convenient reach of the driver of the tractor.

In some instances it may be desirable to drive the sprocket wheel 14 and the drum 17 not only selectively but simultaneously. In that event, the present power unit may be constructed as illustrated by way of example in Fig. 4 of the drawings.

Figure 2:
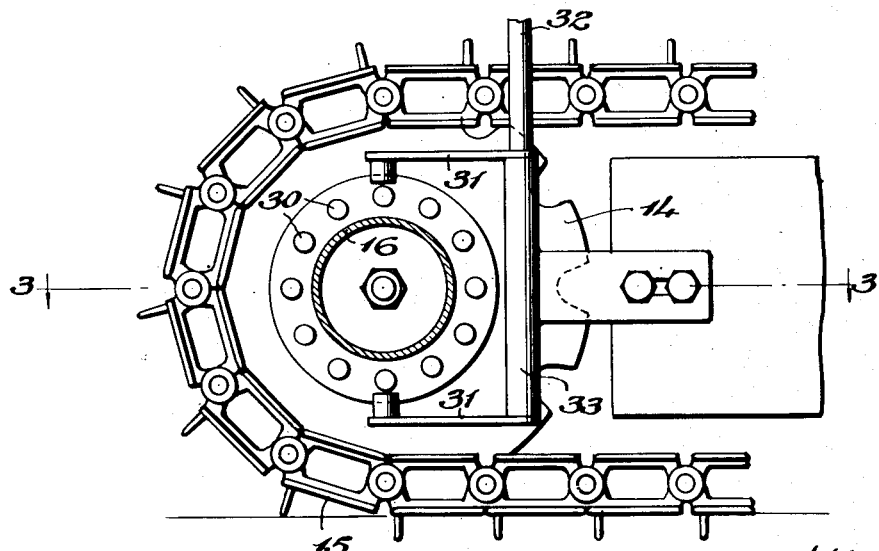
Fig. 2 is a section on an enlarged scale on the line 2—2 of Fig. 1.

Referring to Figure 4, the construction is generally similar to the construction illustrated in Figs. 1 to 3 and includes annular flanges 35 and 36 fixed to the sprocket wheel 14 and the drum 17 at the outer and inner sides thereof, respectively, an annular flange 37 fixed to the sleeve 16 intermediate the flanges 35 and 36, and a pair of rings 38 and 39 both of which are loose on the sleeve 16 and slidable therealong, the former being disposed between the flanges 35 and 37 and the latter being disposed between the flanges 36 and 37. The flanges 35 and 36 have fixed thereto and extending outwardly and inwardly therefrom, respectively, annular series of pins 40 and 41, respectively, which are engaged in holes 42 and 43 in the rings 38 and 39, respectively; the flange 37 has fixed thereto and projecting from opposite sides thereof annular series of pins 44 and 45, respectively, and the rings 38 and 39 have annular series of holes 46 and 47, respectively, to receive the pins 44 and 45, respectively.

The spacing of the flanges 35, 36 and 37, the widths of the rings 38 and 39, and the lengths of the pins 40, 41, 44 and 45 are such that the pins 40 and 41 maintain the rings 38 and 39 constantly coupled to the sprocket wheel 14 and the drum 17, respectively, and that the rings 38 and 39 are shiftable along the sleeve 16 to be either coupled to or uncoupled from the flange 37 through the instrumentality of the pins 44 and 45 and the holes 46 and 47. It thus follows that merely by shifting of the rings 38 and 39 along the sleeve 16, both the sprocket wheel 14 and the drum 17 may be either drivingly connected to or drivingly disconnected from the sleeve 16, or either said sprocket wheel or said drum may, to the exclusion of the other, be either drivingly connected to or drivingly disconnected from said sleeve.

Any suitable means conveniently operable by the driver may be provided for individually shifting the rings 38 and 39 along the sleeve 16, such means being, for example, generally the same as the means illustrated and described for shifting the ring 24 of the Figs. 1 to 3 form of the invention.

From the foregoing description considered in connection with the drawings, it will be evident that I have provided an extremely simple and efficient means for powering a cable drum which may be applied to any standard tractor or other self-propelled vehicle without substantial modification of the vehicle structure.

In the appended claims the term "traction means" is used to denote any ground-engaging elements which furnish traction to the vehicle, whether the same be the tracks of a crawler tractor, the wheels of a tractor or truck, or any accessory ground-engaging elements with which the vehicle may be equipped. Similarly, the term "final drive shaft" is used herein to denote the last shaft of a train of gearing between an engine and traction means by which the traction means is driven by the engine.

While I have shown forms of my invention which have been found satisfactory under actual conditions of service, I recognize that many modifications may be made therein as conditions require and accordingly assert for my invention an interpretation and range of equivalents consistent with the scope of the appended claims.

I claim:

1. In a tractor, a final drive shaft, a sleeve fixed to said final drive shaft for rotation therewith, traction means and a cable drum both mounted loosely on said sleeve and each having an annular series of holes therein, a clutch flange fixed to said sleeve and disposed adjacent to said traction means and having therein an annular series of holes for alinement with the holes in said traction means, a second clutch flange fixed to said sleeve and disposed adjacent to said cable drum and having therein an annular series of holes for alinement with the holes in said cable drum, a third clutch flange loose on said sleeve between said first mentioned flanges and having projecting from one side thereof an annular set of pins to enter the holes in said traction element and said first mentioned flange to drivingly connect said traction means to said sleeve, a second annular set of pins projecting from the other side of said third flange to enter the holes in said second mentioned flange and said cable drum to drivingly connect said cable drum to said sleeve, said third flange being slidable along said sleeve to selectively engage its said sets of pins in their related holes to selectively connect said traction means and said cable drum to said sleeve, and means for sliding said third flange along said sleeve.

2. In a tractor, a final drive shaft, a sleeve fixed to said final drive shaft for rotation therewith, traction means and a cable drum both mounted loosely on said sleeve in spaced relationship to each other and each having projecting inwardly therefrom an annular set of pins, a flange fixed to said sleeve intermediate said traction means and said cable drum and having projecting from each side thereof an annular set of pins, a second flange loose on said shaft between said traction means and said first flange and having therein an annular set of holes in which the pins of said traction means are at all times disposed whereby said second flange is at all times coupled to said traction means, said second flange having therein a second annular set of holes and being slidable along said sleeve to cause the set of pins at one side of said first mentioned flange to enter or to be withdrawn from its said second set of holes so as either to drivingly connect or drivingly disconnect said traction means to or from said sleeve, a third flange loose on said shaft between said cable drum and said first flange and having therein an annular set of holes in which the pins of said cable drum are at all times disposed whereby said third flange is at all times coupled to said cable drum, said third flange having therein a second annular set of holes and being slidable along said sleeve to cause the pins at the other side of said first flange to enter or to be withdrawn from its said second set of holes so as to drivingly connect or drivingly disconnect said cable drum to or from said sleeve, and means for shifting said second and said third flanges along said sleeve.

3. In a tractor, a final drive shaft, a sleeve fixed to an end of said shaft for rotation therewith and extending outwardly beyond said end of said shaft, a traction wheel mounted on said sleeve for rotation relative thereto, a cable drum mounted on said sleeve for rotation relative thereto and disposed outwardly with respect to said traction wheel, clutch formations on each of said traction wheel and said cable drum, a member fixed to said sleeve between said traction wheel and said cable drum and having clutch formations at each side thereof, a clutch element mounted on said sleeve between said member and said traction wheel and constantly engaged with the clutch formations of the latter for rotation therewith, said clutch element being shiftable along said sleeve for engagement with and disengagement from the clutch formations at one side of said member to couple and uncouple said traction wheel with and from said sleeve, and a second clutch element mounted on said sleeve between said member and said cable drum and constantly engaged with the clutch formations of the latter for rotation therewith, said second clutch element being shiftable along said sleeve for engagement with and disengagement from the clutch formations at the other side of said member to couple and uncouple said cable drum with and from said sleeve.

4. In a tractor, a final drive shaft, a sleeve fixed to an end of said shaft for rotation therewith and extending outwardly beyond said end of said shaft, a traction wheel mounted on said sleeve for rotation relative thereto, a cable drum mounted on said sleeve for rotation relative thereto and disposed outwardly with respect to said traction wheel, clutch formations on each of said traction wheel and said cable drum, a member fixed to said sleeve between said traction wheel and said cable drum and having clutch formations at each side thereof, a clutch element mounted on said sleeve between said member and said traction wheel and constantly engaged with the clutch formations of one of said traction wheel and said member for rotation therewith, said clutch element being shiftable along said sleeve for engagement with and disengagement from the clutch formations of the other of said traction wheel and said member to couple and uncouple said traction wheel with and from said sleeve, and a second clutch element mounted on said sleeve between said member and said cable drum and constantly engaged with the clutch formations of one of said cable drum and said member for rotation therewith, said second clutch element being shiftable along said sleeve for engagement with and disengagement from the clutch formations of the other of said cable drum and said member to couple and uncouple said cable drum with and from said sleeve.

5. In a tractor, a final drive shaft, a sleeve fixed to an end of said shaft for rotation therewith and etxending outwardly beyond one end of said shaft, a traction wheel mounted on said sleeve for rotation relative thereto, a cable drum mounted on said sleeve for rotation relative thereto and disposed outwardly of said traction wheel, a clutch flange fixed to said sleeve between said traction wheel and said cable drum, a clutch member slidably mounted on said sleeve between said traction wheel and said clutch flange, said clutch member being constantly engaged non-rotatively with one of said traction wheel and said clutch flange and by sliding movement thereof along said sleeve being engageable with and disengageable from the other of said traction wheel and said clutch flange to drivably connect and disconnect said traction wheel with and from said sleeve, and a second clutch member slidably mounted on said sleeve between said cable drum and said clutch flange, said clutch member being constantly engaged non-rotatively with one of said cable drum and said clutch flange and by sliding movement thereof along said sleeve being engageable with and disengageable from the other of said cable drum and said clutch flange to drivably connect and disconnect said cable drum with and from said sleeve independently of drivably connecting and disconnecting said traction wheel with and from said sleeve.

JULIUS HELLER.

REFERENCES CITED

The following references are of record in the file of this patent:

UNITED STATES PATENTS

| Number | Name | Date |
|---|---|---|
| 1,547,496 | Holt | July 28, 1925 |
| 1,730,707 | Williamson | Oct. 8, 1929 |
| 1,731,529 | Fellers | Oct. 15, 1929 |

FOREIGN PATENTS

| Number | Country | Date |
|---|---|---|
| 312,600 | Italy | Nov. 20, 1933 |
| 734,790 | France | Oct. 28, 1932 |